United States Patent [19]

Schauder et al.

[11] Patent Number: 4,814,964
[45] Date of Patent: Mar. 21, 1989

[54] VARIABLE SPEED A-C DRIVE

[75] Inventors: Colin D. Schauder, Murrysville Boro; John Rosa, Penn Hills; Theodore M. Heinrich, Murrysville Boro, all of Pa.

[73] Assignee: Westinghouse Electric Corp., Pittsburgh, Pa.

[21] Appl. No.: 149,234

[22] Filed: Jan. 27, 1988

[51] Int. Cl.$^4$ ............................................. H02M 5/45
[52] U.S. Cl. ...................... 363/37; 363/65; 318/803
[58] Field of Search .................. 363/35, 37, 51, 65–71; 318/720–724, 797, 798, 799, 800, 801–803

[56] References Cited

U.S. PATENT DOCUMENTS

| | | | |
|---|---|---|---|
| 4,084,220 | 4/1978 | Aramatsu | 363/37 |
| 4,392,099 | 7/1983 | Kuniyoshi | 363/65 |
| 4,426,611 | 1/1984 | Espelage et al. | 318/803 |

OTHER PUBLICATIONS

A New Traction System Via Self-Controlled Synchronous Motors for Electric Locomotives, by A. Cossie et al., PCI '81 Proceedings, 417–434 and 436.

*Primary Examiner*—Peter S. Wong
*Attorney, Agent, or Firm*—D. Schron

[57] ABSTRACT

A load commutated inverter (LCI) a-c drive system includes a synchronous motor with two 30 degree angularly displaced sets of three-phase windings. Each set of motor windings is powered by a three-phase inverter fed by a three-phase rectifier in a separate d-c loop. The three-phase rectifiers are fed by either a generator with two angularly displaced sets of three-phase windings or by a transformer with a three-phase primary winding, and delta and wye secondary windings separately supplying the two rectifiers. Twelve-pulse operation in the line commutated mode with substantially constant d-c link currents significantly reduces torque pulsations. At low speeds, sinusoidal segment pulsed d-c currents in the d-c links are gated to pairs of windings in the two sets of motor windings which generate component MMFs either 90 degrees or 150 degrees displaced to produce a resultant rotating motor MMF of constant magnitude to completely eliminate torque pulsations. Since the repetition rates of the pulsed d-c link currents in these two instances are 2 and 1.2 times the fundamental motor frequency respectively, the range of motor speeds over which torque pulsations can be completely eliminated is substantially increased, while torque pulsations at all higher speeds are greatly reduced.

19 Claims, 5 Drawing Sheets

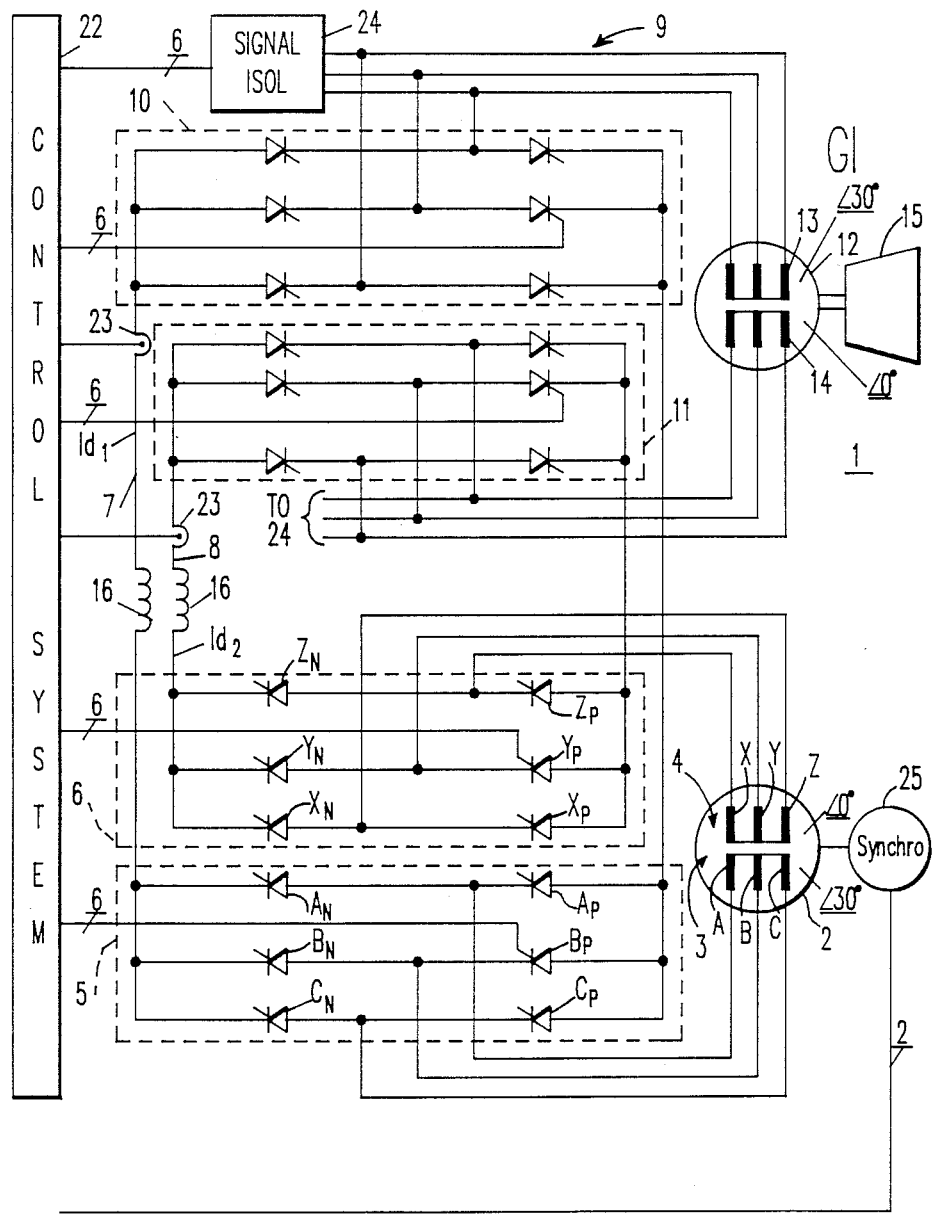
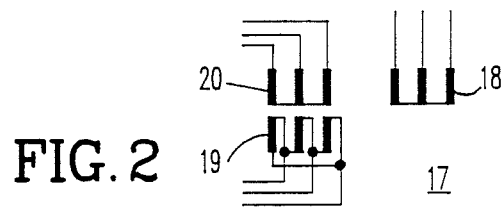
FIG. 1
FIG. 2

1

VARIABLE SPEED A-C DRIVE

BACKGROUND OF THE INVENTION

1. Field of the Invention

This invention is directed to an a-c drive system of the load commutated inverter type for a synchronous motor. More particularly, it is directed to a load commutated inverter a-c drive using a circuit topology for twelve-pulse operation at load commutated operation and a novel scheme for pulsed d-c current operation to avoid torque pulsations at starting and low speed.

2. Background Information

A currently available six-pulse a-c drive system includes a line side converter feeding a motor side inverter through a d-c link. The inverter providing variable frequency a-c power to the motor is of the load commutated type (LCI) which utilizes the electromagnetic force (EMF) of the motor to commutate its thyristor switches. The motor required for this type of operation is a synchronous machine. At standstill, and at low rotational speeds, the motor EMF is insufficient to effect commutation of the inverter thyristors, and other means must be employed. The current system pulses the d-c link current at low speed. During the zero dwell periods of the current pulses, the inverter thyristors recover from conduction. The thyristors next in the conduction sequence are then gated on and conduct the next d-c current pulse. The d-c current pulses are shaped by the line side converter and are essentially rectangular. This type of operation causes undesirable torque pulsations in the motor at 6K times the motor frequency ($K=1, 2, 3, \ldots$). The pulse width is 60 degrees electrical, thus the repetition rate of the d-c pulse signal is six times $f_M$, the desired motor frequency.

U.S. Pat. No. 4,084,220 is directed toward reducing torque pulsations at low speeds in an LCI type a-c drive system. Instead of using one line side converter and one motor side converter connected through one d-c link, the scheme disclosed in this patent utilizes two line side and two motor side converters configured into two d-c loops. The pulsed currents forced into these loops by the line side converters consist of sinusoidal segments. In the motor windings, they are combined into pure sinusoidal currents. The pulse repetition rate of the patented scheme is $3f_M$.

This scheme of U.S. Pat. No. 4,084,220 theoretically causes no torque pulsations at low speed. At elevated speeds, however, when the system operates with load commutation, operation reverts to the conventional 6-pulse mode, resulting in torque pulsations of 6K order (i.e., 6K times motor frequency, where $K=1, 2, 3, \ldots$), even though to implement the distortion free pulsed d-c current operation requires the power electronics hardware of a twelve-pulse system. Thus, desirable performance at low speeds is obtained at the expense of two sets of LCI's, but no benefit is derived from this added complexity at elevated speeds where reduced torque pulsation is often equally desirable.

A-c drives are known in which two three-phase star connected stator windings of a synchronous motor offset 30 degrees electrically with respect to one another are fed by separate inverter bridges. Twelve-pulse operation of these systems in the line commutated mode with the inverters fed by constant d-c currents reduces torque pulsations over those generated in six-pulse systems. However, like the above mentioned six-pulse system, essentially rectangular dc pulses are provided to the inverters to commutate the thyristors at standstill and low speeds. While this reduces the harmonic components in the motor MMF over those produced in the six-pulse system, undesirable low speed torque pulsations are still present.

It is therefore a primary object of the present invention to provide an a-c drive system and a method of operation thereof which reduces torque pulsations over the entire motor speed range.

It is another object of the invention to provide such a method of operation which completely eliminates torque pulsations at standstill and low speed.

It is yet another object of the invention to provide such a method in which torque pulsations and the attendant mechanical vibration and acoustical noise can be completely eliminated up to higher motor frequencies than currently possible.

SUMMARY OF THE INVENTION

These and other objects are realized by the invention in which a variable speed a-c drive system includes a synchronous motor having a plurality of angularly displaced sets of polyphase windings, a polyphase inverter bridge circuit connected to each set of polyphase windings, means applying d-c currents to the inverter bridge circuits, and means operating the inverter bridge circuit to generate from said d-c currents, phase displaced polyphase alternating currents in the plural sets of polyphase motor windings. The component magnetomotive forces (MMFs) generated by these plural sets of polyphase motor windings combine to produce a resultant MMF with reduced harmonics and hence reduced torque pulsations.

The d-c current for each inverter is generated by a converter from one of a plurality of sets of polyphase a-c supply voltages and is fed to the inverter through a d-c link. The plurality of sets of polyphase a-c supply voltages can be produced by an a-c generator having a plurality of angularly spaced polyphase windings. Alternatively, the sets of polyphase a-c supply voltages can be generated from a single polyphase source by a transformer with multiple secondary windings which produce sets of phase shifted polyphase voltages. For instance, a transformer with a delta primary and delta and wye connected secondaries can produce two sets of 30 degree displaced three-phase a-c voltages. Actually, the a-c source need not have the same number of sets of polyphase windings, and could even provide only one set of polyphase voltages to the converter, however, the plural sets of polyphase source voltages produce a smoother MMF in the a-c generator or lower harmonic distortion of the primary a-c line currents of the transformer.

At high motor speeds, the converters are controlled to generate substantially constant d-c link currents which are applied to the inverters. Controlled rectifiers, such as thyristors, in the inverters are cyclically fired and load commutated to produce essentially rectangular shaped alternating currents in the plural sets of motor windings which are angularly displaced with respect to one another. In the preferred form of the invention, where the system includes a synchronous motor with two sets of three-phase stator windings fed by two, three-phase inverters, twelve-pulse operation is achieved, which substantially reduces the harmonics in the motor MMF.

At standstill and low speeds pulsed d-c currents are applied to the inverters. These pulsed d-c currents are shaped by the line side converters. The pulses consist of sinusoidal segments. The inverters gate portions of these sinusoidal segment d-c pulse currents to pairs of windings in each of the plural sets of motor windings to produce alternating currents which are phase related to produce a rotating motor MMF of constant magnitude. Such pulsed operation completely eliminates harmonics in the motor MMF and hence torque pulsations.

For an a-c drive system in accordance with the invention having two sets of three-phase motor windings, inverters, d-c links, and line side converters, there are two preferred options for pulsed operation. In the first, two full wave rectified pulsed d-c currents are generated in quadrature in the two d-c links. The inverters are operated to gate these pulsed d-c currents to a pair of windings in each set of three-phase windings which produce sinusoidal component MMFs in quadrature. The resultant motor MMF is the rotating MMF of constant magnitude. In this option, only two windings in each set of three phase motor windings are used. The repetition rate of the pulsed d-c link currents is two times the fundamental motor frequency.

In the second pulsed mode option, sinusoidal segment d-c pulsed currents generated in the d-c links are 150 electrical degrees displaced. The inverters are operated to gate these d-c current pulses to successive pairs of windings in the two sets of three-phase motor windings which generate component MMFs which are 150 degrees displaced from one another. The d-c pulses are shaped such that the resultant rotating MMF is again of constant magnitude. In this option, all of the motor windings are utilized although only two windings in each set of three phase windings are used at a time. The repetition rate of the d-c pulsed currents is 1.2 times the fundamental motor frequency. Hence, the present invention can be used to generate a harmonic free motor MMF at higher motor speeds than available in the prior art where the pulse repetition rate is three times the fundamental motor frequency.

The invention embraces both the apparatus for and method of operating the variable speed a-c drive.

BRIEF DESCRIPTION OF THE DRAWINGS

A full understanding of the invention can be gained from the following description of the preferred embodiments when read in conjunction with the accompanying drawings in which:

FIG. 1 is a schematic diagram of an a-c drive system in accordance with the teachings of the invention.

FIG. 2 illustrates an alternative arrangement for generating staggered a-c source voltages for the a-c drive system of FIG. 1.

DESCRIPTION OF THE PREFERRED EMBODIMENTS

Figure 3:
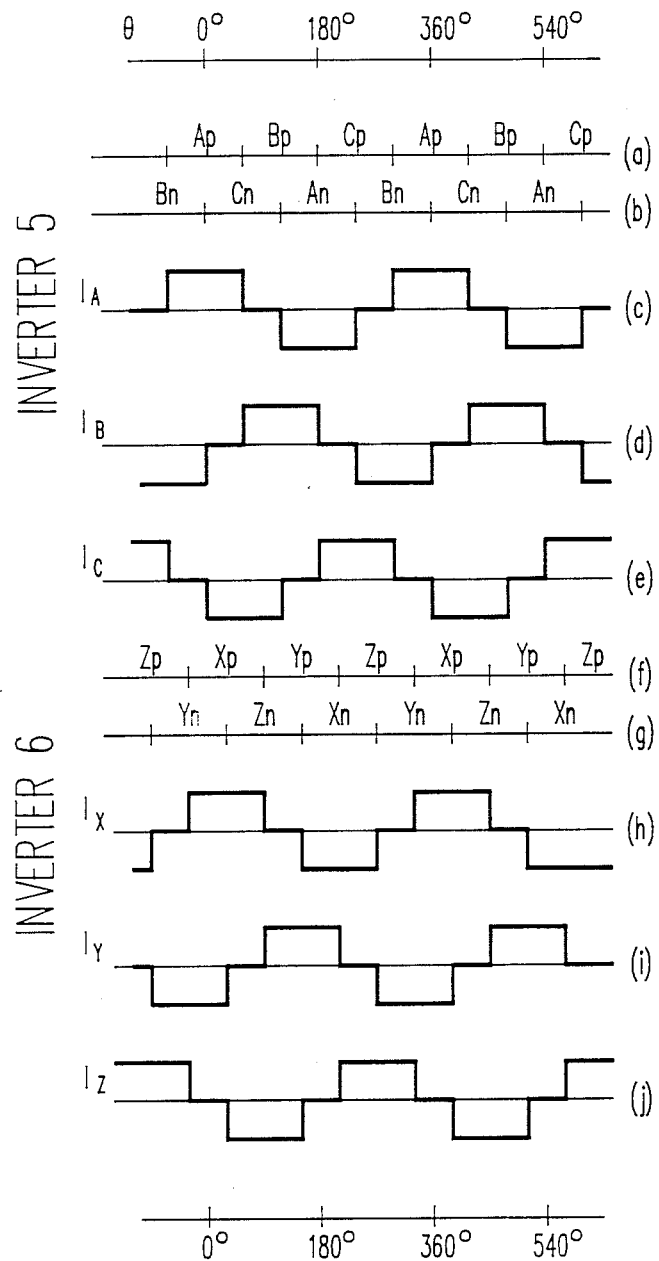
FIGS. 3a-d illustrate waveforms and thyristor conduction intervals for operation of the a-c drive system of FIG. 1 in the load commutated mode.

The present invention is based on the recognition that with a suitable pulse shaping scheme it is possible to operate twelve-pulse hardware of an a-c drive system with pulsed d-c currents at low speeds without causing torque pulsation, and without compromising the benefits of twelve-pulse operation in the LCI mode.

The basic configuration of the a-c drive system 1 is shown in FIG. 1. The synchronous motor 2 has two three-phase sets of stator windings 3 and 4 respectively with the windings A, B and C of winding set 3 displaced 30 degrees in advance of the windings X, Y and Z of winding set 4. The two sets of motor stator windings 3 and 4 are fed by separate three-phase load commutated inverters 5 and 6 respectively. Each inverter 5 and 6 comprises a controlled rectifier bridge circuit having pairs of thyristors arranged in positive and negative banks connected with each phase of the associated set of motor windings. Other types of controlled rectifiers such as thyratrons and ignitrons could be used where load demand permits.

Current is provided to the converters 5 and 6 by power source 9 through d-c links 7 and 8 respectively.

The d-c links 7 and 8 are fed by line side converter 10 and 11 respectively. Each line side converter comprises a three-phase controlled rectifier bridge circuit. The converters 10 and 11 are supplied with three-phase voltages with the voltages applied to converter 10 advanced 30 degrees with respect to the voltages provided to converter 11. In the drive system of FIG. 1, two, three-phase staggered voltages are fed to the converters 10 and 11 by a generator 12 having one set of three-phase windings 13 displaced 30 degrees in advance of a second set of three-phase windings 14. This generator 12 may be driven by a turbine 15 or other prime mover. The staggered three-phase voltages provided by the generator 12 are converted to d-c by the converters 10 and 11. The two resultant d-c currents are circulated through the inverters 5 and 6 by the d-c links 7 and 8 respectively. Reactors 16 in the d-c links reduce ripple in the d-c link currents.

Alternatively, the staggered three-phase source voltages can be supplied to the converters 10 and 11 by a transformer 17 illustrated in FIG. 2 with a three-phase primary winding 18 and delta/wye connected dual secondary windings 19 and 20 respectively which would also produce the 30 degree phase displacement between the two, three-phase supply voltages. The number of sets and the number of phases in each set of source currents is not directly related to the number of phases and sets of motor windings since the source voltages are converted to d-c voltages by the rectifiers.

The thyristors of the dual converter/inverter pairs of the drive system are controlled by a control system 22. Measurements of the link currents $Id_1$ and $Id_2$ in the two d-c loops made by current transducers 23 are provided to the control system 22 along with the instantaneous value of the 6 supply voltages through isolation circuits 24. In addition, the phase-angles $\theta_1$ and $\theta_2$ of the magnetomotive force (MMF) generated by the 2 sets of motor windings 3 and 4 and as measured by a synchro transmitter 25 connected to the motor shaft are also provided to the control system. The control system 22 uses these measurements in generating firing pulses for the thyristors of the dual converter/inverter combinations. For clarity, single lines have been shown to represent plural connections, such as to the gates of the thyristors, however, in each such instance the number of such plural leads is indicated by a slash through the single line together with a numeral representing the actual number of leads.

For operation of the a-c drive system of the invention in the load commutated (LCI) mode, the converters 10 and 11 are controlled to generate substantially constant d-c currents in the d-c links 7 and 8. Operation of the inverters 5 and 6 in the LCI mode is illustrated in FIG. 3. FIGS. 3a and 3b illustrate the conduction intervals of the individual thyristors in the positive and negative banks respectively in the inverter 5. FIGS. 3c–e show the resultant three-phase output currents delivered to the A, B, C set of windings 3 in the synchronous motor 4. Similarly, FIGS. 3f and g depict the conduction intervals, and FIGS. 3h–j the resultant three-phase output currents, delivered to the X, Y, Z set of windings 4 by the inverter 6. It should be noted that the output currents in phases A, B, C, lead those of phases X, Y, Z by 30 degrees.

As can also be seen from FIGS. 3a–j in the LCI mode of operation each thyristor is conducting for 120 degrees, and the winding currents are of the 6-pulse type since each of the six thyristors in the inverter serving each set of windings is fired once during each cycle of the motor frequency. However, the resulting magnetomotive force (MMF) produced in the air gap of synchronous motor 4 is of the 12-pulse type as the two sets of component MMF's produced by the two sets of windings 3 and 4 are 30 degrees displaced. The resulting torque pulsations are of 6K order with K 2, 4, 6, . . . Thus, the lowest frequency torque pulsation is twice as high as in the six-pulse schemes of the earlier mentioned single inverter system and the system of U.S. Pat. No. 4,084,220, and the corresponding amplitude is half as much. All components corresponding to $K = 1, 3, 5 \ldots$ are cancelled.

Operation in the pulsed d-c current mode is illustrated in FIGS. 4–7. Two pulse trains $Id_1$ and $Id_2$ are produced in the d-c links 7 and 8 by the converters 10 and 11 respectively and distributed to the two sets of motor windings 3 and 4 by inverters 5 and 6, respectively. The pulse shapes are mandated by the requirement of producing a net rotating, harmonic free MMF of $\omega = 2\pi f_M$ angular frequency in the motor air gap. The circuit topology offers two practical options for shaping and distributing the d-c current pulses to satisfy the requirement of producing a harmonic free, rotating MMF.

Figure 4:
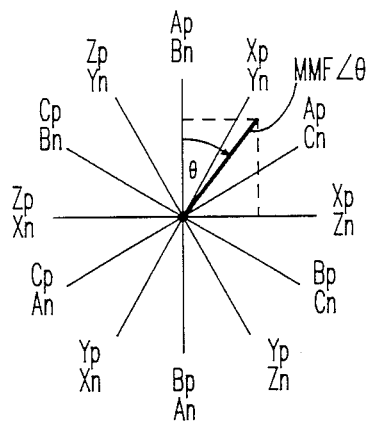
FIG. 4 is a phasor diagram illustrating one scheme for operation of the a-c drive system of FIG. 1 in a pulsed mode at low speed.

FIG. 4 is a phasor diagram illustrating the first option. The rotating MMF wave is synthesized using two orthogonal, spatial MMF's produced by windings A, B and X, Z of winding sets 3 and 4 respectively. The rotating, harmonic free MMF is an MMF of constant magnitude which rotates at the angular frequency $\omega = 2\pi f_M$. To generate such a rotating MMF wave, at the angle $\theta = \omega t$ shown, the instantaneous value of current $Id_1$, distributed by inverter 5 to the A–B windings must be $Idmax \cdot \cos \theta$, with thyristors $A_p$, $B_n$ conducting. The instantaneous value of current $Id_2$ distributed to the X–Z windings must be $Id$ max. $\sin \theta$, with thyristors $X_p$, $Y_n$ conducting. Idmax is the peak of the current pulse It can further be shown that the pulse trains. $Id_1$ and $Id_2$ for arbitrary values of $\theta$ are defined by:

$$Id_1 = Idmax \cdot |\cos \theta|$$

$$Id_2 = Idmax \cdot |\sin \theta|$$

Thus, the pulse trains for this option are "rectified sinusoids", 90 degrees displaced, with a $2f_M$ repetition rate. The $Id_1$ and $Id_2$ pulse trains, which are illustrated in FIGS. 5a and b respectively, are generated in the d-c links 7 and 8 by the converters 10 and 11.

Figure 5:
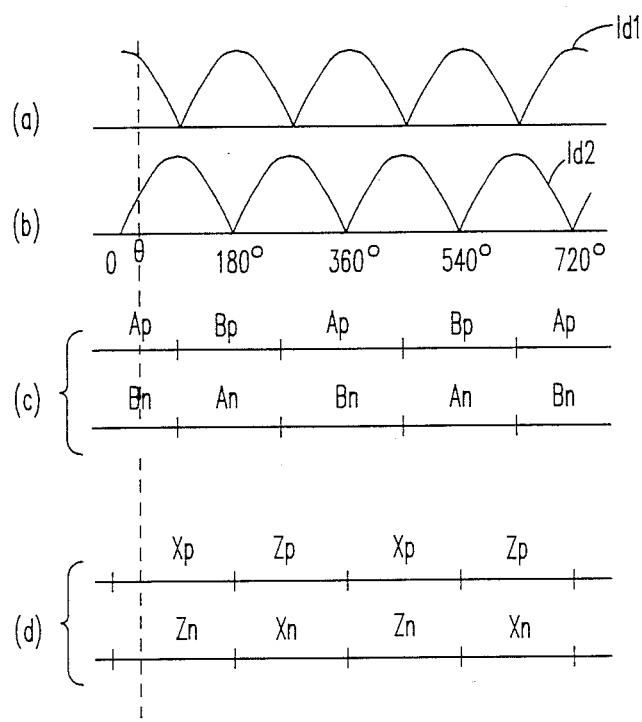
FIGS. 5a and b are waveform diagrams of the d-c link currents, and FIGS. 5c and d illustrate the inverter thyristor conduction intervals for the a-c drive system of FIG. 1 when operated in accordance with the scheme illustrated in FIG. 4.

As the rotating MMF passes the phasor $X_p Z_n$ shown in FIG. 4, thyristors $A_p$, $B_n$ are commutated off as $Id_1$ goes to zero, and thyristors $A_n$, $B_p$ are gated on to reverse the current in the A–B windings and continue generation of the rotating synthesized MMF. Similarly, as the rotating MMF passes the phasor $A_n B_p$, the thyristors $X_p$, $Z_n$ are commutated off and thyristors $X_n$, $Z_p$ are turned on, and so on. This cyclical firing of the inverter thyristors is shown in FIGS. 5a and d. As can be appreciated from FIG. 5, the illustrated pattern of firing thyristors results in the generation of sinusoidal currents in the A–B and X–Y windings which are 90 degrees electrically shifted to produce 90 degrees spatially displaced MMF's which combine to generate the rotating MMF of constant magnitude.

As will be noticed with this option of pulse mode operation, the motor 2 is operated as a two-phase motor; windings C and Y are not utilized at low speeds. In other words, thyristors $C_p$, $C_n$, $Y_p$ and $Y_n$ are not gated. Of course, other combinations of orthogonal pairs of windings in the two sets of motor stator windings could be selected.

Figure 6:
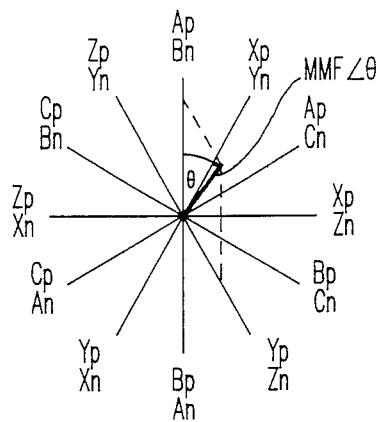
FIG. 6 is a phasor diagram illustrating an alternative scheme for operating the a-c drive system of FIG. 1 at low speed in the pulsed mode.
Figure 7:
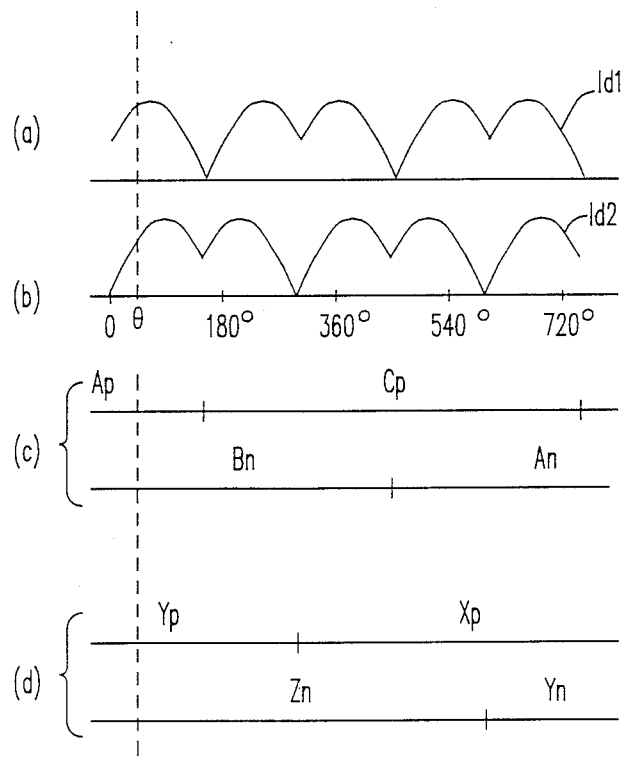
FIGS. 7a and b are diagrams illustrating the d-c link pulsed currents, and FIGS. 7c and d illustrate the inverter thyristor conduction intervals for the a-c drive system of FIG. 1 when operated in accordance with the scheme illustrated in FIG. 5.

The second option for pulsed operation at low speeds is illustrated by the phasor diagram of FIG. 6. The rotating constant magnitude MMF is synthesized by 150 degrees displaced spatial MMFs. At the angle $\theta = \omega t$ shown in FIG. 6, the instantaneous value of the current $Id_1$ distributed to the A–B windings must be $Idmax \cdot \sin (150 \text{ degrees} - \theta)$, with thyristors $A_p$, $B_n$ conducting, and the instantaneous value of current $Id_2$ distributed to the Y–Z windings must be $Idmax \cdot \sin \theta$, with thyristors $Y_p$, $Z_n$ conducting. As the MMF rotates past phasor $Y_p$, $Z_n$ thyristors $A_p$, $B_n$ are commutated off and the windings C–B which generate a phasor 150 degrees displaced beyond phasor $Y_p Z_n$ are energized by the turning on of thyristors $C_p$ and $B_n$. Similarly, as the MMF rotates through phasor $C_p B_n$, thyristors $Y_p$ and $Z_n$ are commutated off and thyristors $X_p Z_n$ are fired to energize the X–Z windings which produce a spatial MMF 150 degrees displaced with respect to that produced by windings C-B. It can thus be shown that the pulse trains of $Id_1$ and $Id_2$ for arbitrary values of $\theta$ are defined as follows:

| $\theta$ | $Id_1/Idmax$ | $Id_2/Idmax$ |
| --- | --- | --- |
| 0 degrees to 150 degrees | $\sin(\theta + 30 \text{ degrees})$ | $\sin\theta$ |
| 150 degrees to 300 degrees | $\sin(\theta - 150 \text{ degrees})$ | $\sin(\theta - 120 \text{ degrees})$ |
| 300 degrees to 450 degrees | $\sin(\theta - 270 \text{ degrees})$ | $\sin(\theta - 300$ |

-continued

| θ | Id₁/Idmax | Id₂/Idmax |
|---|---|---|
| 450 degrees to 600 degrees | sin (θ − 450 degrees) | sin (θ − 420 degrees) |
| 600 degrees to 750 degrees | sin (θ − 570 degrees) | sin (θ − 600 degrees) | etc.
where:

$$\theta = \frac{\omega t \, 180}{\pi} \text{ degrees}$$

The resulting $Id_1$ and $Id_2$ pulse trains are illustrated in FIGS. 7a and b. The progression of conduction intervals for the inverter thyristors is as follows:

| Inverter 3 | Inverter 4 |
|---|---|
| AB | YZ |
| CB | YZ |
| CB | XZ |
| CA | XZ |
| CA | XY |
| BA | XY | etc.

Such a sequence of thyristor conduction intervals is partially illustrated in FIGS. 7c and d.

With this second pulse mode option, all motor windings re utilized, but only two windings at a time in each set of motor windings are energized at any given instant. The pulse repetition rate is $(360/300)f_M = 1.2f_M$ and each thyristor conducts for 600 degrees and is off for 1200 degrees.

The pulse shapes shown for the two exemplary pulse mode options ensure complete absence of torque pulsations. A compromise solution resulting in reduced, but not zero, torque pulsations could employ trapezoidal current pulses which approximate the sinusoidal shapes. As the pulse repetition rates for the exemplary pulse trains are $2f_M$ and $1.2f_M$ respectively, they can be used to produce torque pulsation free operation up to higher motor frequencies than is possible with the scheme of U.S. Pat. No. 4,084,220 where the repetition rate of the pulse trains in low speed operation is $3f_M$.

Figure 8:
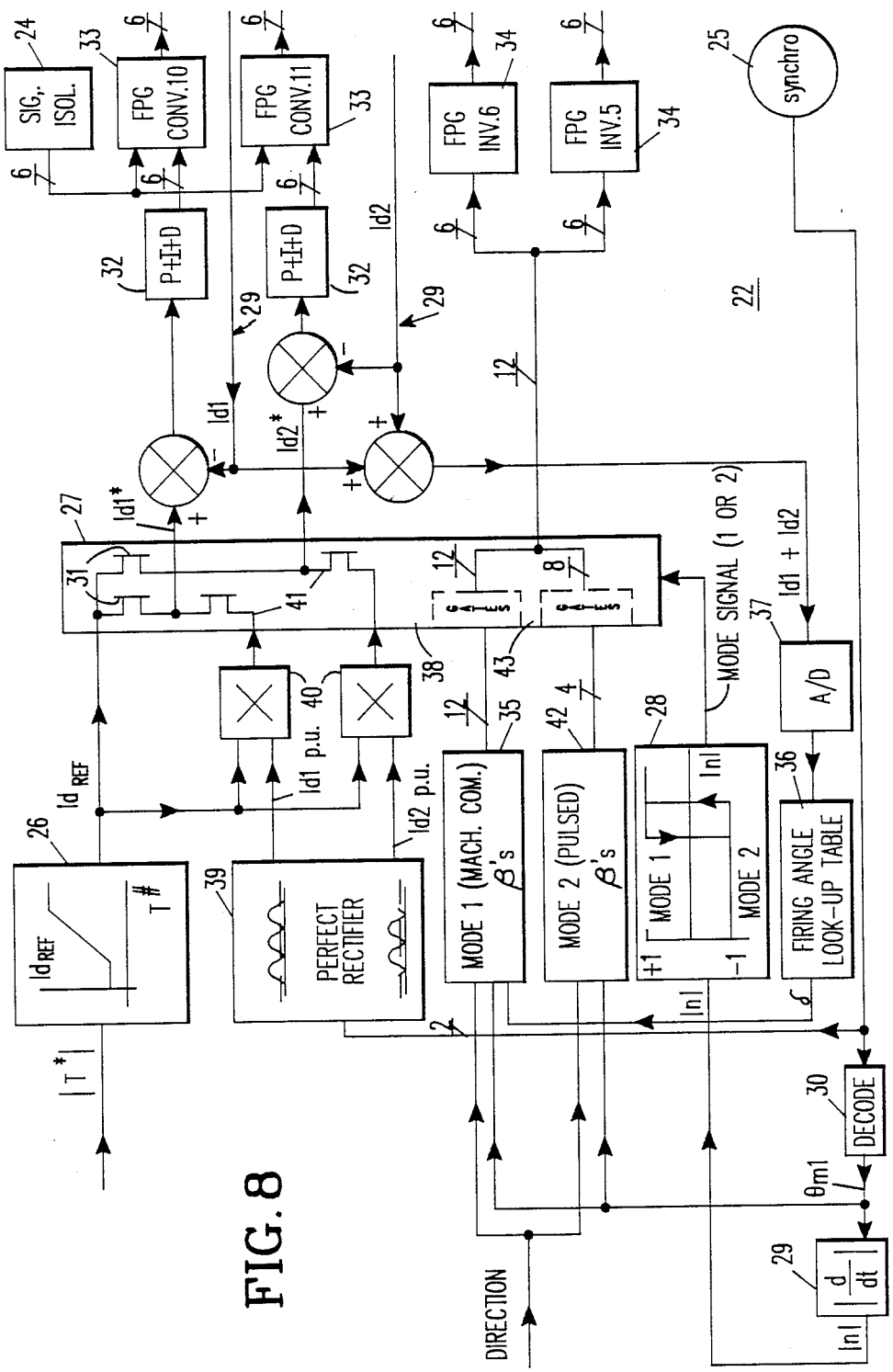
FIG. 8 is a schematic diagram of one form of a suitable control system for operating the a-c drive system of FIG. 1 in the LCI mode and in the option for pulsed mode operation explained in connection with FIGS. 4 and 5.

FIG. 8 illustrates one form of a control system 22 for controlling the system of FIG. 1 using the first option described above for low speed operation, and the LCI mode of operation at higher speeds. A torque reference signal |T*| is provided by an external control loop (not shown). A signal generator 26 converts this demanded torque signal to $Id_{REF}$ which defines the average value of the two d-c link currents $Id_1$ and $Id_2$. The operating mode is determined by the state of mode selector 27, controlled by mode controller 28 which in turn sets the operating mode in response to motor rotational velocity |n|. The rotational velocity |n| is determined in circuit 29 as a function of motor rotational angle $\theta_{M1}$ derived by decoder 30 from the output of synchro transmitter 25.

Mode (1) corresponds to the LCI mode of operation. In this mode, $Id_{REF}$ is supplied directly through switches 31 of mode selector 27 as $Id_1^*$ and $Id_2^*$, the current reference inputs to the two link current regulators 32 which control the firing pulse generators 33 for the line side converters 10 and 11. The control loops 29 are closed via d-c current sensors 23 (FIG. 1). The exemplary current regulators 32 apply proportional, integral and derivative control action to the d-c link current error signals. Firing of the generator side converter thyristors is synchronized with the line voltages through isolation circuit 24.

The firing pulses to the thyristors in the motor side inverters 5 and 6 are delivered by firing pulse generators 34. In Mode (1), the LCI mode, these pulses are timed by circuit 35 which obtains the necessary firing angle information from look-up table 36, a motor rotational direction signal and motor rotational angle $\theta_{M1}$. The firing angles are determined as a function of total link current $Id_1 + Id_2$ converted to digital form by A/D converter 37. The control signals from circuit 35 are applied to the firing pulse generator 34 through switches 38 in the mode selector 27.

In Mode (2), pulsed d-c current operation, the d-c link current references have the "rectified" sinusoidal shape produced in waveform generator 39 which rectifies the orthogonal signals of synchro transmitter 25. These "normalized" signals are scaled by $Id_{REF}$ via analog multipliers 40 to obtain $Id_1^*$ and $Id_2^*$ which are applied to the converter control loops through switches 41 of mode selector 27. In this mode, the firing pulses to inverters 5 and 6 are timed for the selected direction of rotation by circuit 42 which triggers these pulses at the zero crossings of the synchro transmitter's signals.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A variable speed as-c drive system comprising:
   a synchronous motor having two sets of three-phase windings angularly spaced 30 degrees from one another;
   a three-phase inverter bridge circuit connected to each set of three-phase windings;
   means applying sinusoidal segment d-c pulsed currents having a repetition rate of not more than two times motor fundamental frequency to said inverter bridge circuits; and
   means operating said inverter bridge circuits to generate from said sinusoidal segment d-c pulsed currents phase displaced three-phase alternating currents in said two sets of three-phase windings in said synchronous motor which produce a harmonic free rotating motor MMF of constant magnitude.

2. The system of claim 1 wherein said means applying d-c currents to said inverter bridge circuits include:
   means generating two angularly displaced sets of three-phase a-c supply voltages;
   a three-phase rectifier associated with each inverter bridge circuit to convert one of said sets of three-phase a-c supply voltages to a d-c voltage resulting in one of said d-c currents; and
   a separate d-c link connecting each three-phase rectifier to the associated inverter for applying the d-c current to the inverter.

3. The system of claim 2 wherein the means for generating said plural sets of polyphase supply voltages include an ac-c generator with two angularly displaced sets of three-phased a-c windings.

4. The system of claim 2 wherein said means for generating said two angularly displaced sets of three-phase a-c supply voltages include a three-phase a-c source and a transformer having a three-phase primary connected to the three-phase source, and two sets of three-phase secondary windings for generating said angularly displaced sets of three-phase a-c supply voltages.

5. The system of claim 4 wherein said transformer has a three-phase primary winding, a three-phase delta secondary winding connected to one of said rectifiers and a wye secondary winding connected to the other rectifier.

6. The system of claim 1 wherein said means for applying d-c currents to said inverter bridge circuits selectively, in place of said shaped pulse d-c currents, applies d-c currents of substantially constant magnitude, wherein said inverter bridge circuits include thyristors and wherein said means operating said inverters include means firing said thyristors cyclically to generate alternating currents in said two three-phase sets of windings in said motor which are phase displaced with respect to one another and which are sufficient in magnitude to generate in the motor an EMF which commutates the thyristors.

7. The system of claim 6 wherein said means for operating said inverters fire said thyristors cyclically to generate a twelve-pulse MMF in said synchronous motor.

8. The system of claim 7 wherein said means for operating said inverters turns each thyristor on for 120 degrees and said thyristors are commutated off for 240 degrees.

9. The apparatus of claim 1 wherein said means for operating said inverters include means to gate portions of said sinusoidal segment d-c pulse currents to pairs of windings in said two sets of three-phase motor windings which generate component MMFs in said sets of windings which are 90 degrees displaced with respect to one another.

10. The system of claim 1 wherein said two sets of three-phase motor windings are displaced by 30 degrees and wherein said means for operating said inverters include means to gate portions of said sinusoidal segment d-c pulsed currents to successive pairs of windings in said two sets of three-phase motor windings which generate component MMFs in said sets of windings which are 150 degrees displaced.

11. A variable speed a-c drive system comprising:
synchronous motor with two sets of three-phase windings angularly spaced 30 degrees with respect to one another;
a pair of inverters with controlled rectifier bridges having three-phase a-c outputs and a set of d-c inputs;
a pair of three-phase rectifiers each having a-c inputs and d-c outputs;
d-c links connecting the d-c outputs of the rectifiers to the inverter d-c inputs;
a source generating two sets of three-phase a-c currents and applying one set thereof to the a-c inputs of one of the three-phase rectifiers;
means operating said rectifiers to generate pulsed d-c currents in said d-c links having a frequency not more than two times motor fundamental frequency; and
means operating said inverters to generate from said pulsed d-c currents alternating currents in said two sets of three-phase motor windings phase related to generate a rotating MMF of constant magnitude in the motor.

12. The system of claim 11 wherein said means operating said rectifiers include means generating full wave rectified sinusoidal d-c pulsed currents with a repetition rate of two times the motor frequency in quadrature in the two d-c links, and wherein said means operating the inverter include means to gate said d-c pulse currents to two phases only of each set of three-phase motor windings to generate sinusoidal component MMFs in said two sets of windings which are in quadrature and which combine to generate said rotating MMF of constant magnitude in said motor.

13. The system of claim 11 wherein said means operating said rectifiers includes means generating sinusoidal segment d-c pulsed currents in said d-c links with a repetition rate of 1.2 times motor frequency and displaced 150 degrees electrically from one another, and wherein said means operating said inverters include means to successively gate portions of said sinusoidal segment d-c pulse currents to pairs of windings in the two sets of three-phase motor windings which generate MMFs 150 degrees apart to thereby generate sinusoidal currents in said successive pairs of windings which combine to generate said rotating MMF of constant magnitude.

14. A method of operating an a-c drive system having a synchronous motor with two sets of three-phase windings displaced by 30 degrees with respect to one another, and a three-phase inverter fed by a d-c link connected to each set of three-phase motor windings, said method comprising steps of:
generating in said d-c links pulsed d-c currents comprising sinusoidal segments having a repetition rate of less than three times motor fundamental frequency, applying said pulsed d-c currents to said inverters, and operating said inverters to gate selected portions of said sinusoidal segments of the d-c pulsed currents to said respective sets of three-phase motor windings to generate in said two sets of three-phase motor windings alternating currents which generate a resultant rotating, harmonic free MMF in said synchronous motor.

15. The method of claim 14 wherein said inverters include thyristor bridge circuits and including operating said a-c drive system in a load commutated mode by alternatively applying to said inverters in place of said pulsed d-c currents, d-c currents of substantially constant magnitude, and firing said thyristor bridge circuits cyclically to generate alternating currents in said three-phase sets of windings which are phased displaced with respect to one another.

16. The method of claim 14 wherein said inverters are operated to gate portions of said sinusoidal segment d-c pulse currents to pairs of windings in said two sets of motor windings which generate MMFs in quadrature to produce said resultant rotating, harmonic free motor MMF.

17. The method of claim 16 wherein generating said pulsed d-c currents comprises generating at a repetition rate of two times motor fundamental frequency full wave rectified sinusoidal pulsed d-c currents which are in quadrature in the two d-c links.

18. The method of claim 14 wherein said inverters are operated to gate portions of said sinusoidal segment d-c pulse currents to successive pairs of windings in said two sets of three-phase motor windings which generate component MMFs in said sets of windings which are 150 degrees displaced with respect to one another, said d-c pulsed currents being generated so that portions gated to said pairs of windings in said two sets of windings spaced by 150 degrees generate MMFs which combine to generate said rotating, harmonic free motor MMF.

19. The method of claim 18 wherein generating said pulsed d-c currents comprises generating in said d-c links at a repetition rate of 1.2 times motor fundamental frequency, pulsed d-c currents made of sinusoidal segments which are displaced by 150 electrical degrees in said tow d-c links.

* * * * *